United States Patent
Rich et al.

(10) Patent No.: US 10,921,777 B2
(45) Date of Patent: Feb. 16, 2021

(54) AUTOMATED MACHINE ANALYSIS

(71) Applicants: Michael David Rich, Clinton, TN (US); Keith Allen Walton, Abingdon, VA (US)

(72) Inventors: Michael David Rich, Clinton, TN (US); Keith Allen Walton, Abingdon, VA (US)

(73) Assignee: Online Development, Inc., Knoxville, TN (US)

( * ) Notice: Subject to any disclaimer, the term of this patent is extended or adjusted under 35 U.S.C. 154(b) by 83 days.

(21) Appl. No.: 16/277,038

(22) Filed: Feb. 15, 2019

(65) Prior Publication Data
US 2019/0250585 A1    Aug. 15, 2019

Related U.S. Application Data

(60) Provisional application No. 62/631,054, filed on Feb. 15, 2018.

(51) Int. Cl.
| | | |
|---|---|---|
| *G05B 19/4065* | (2006.01) | |
| *B23Q 17/09* | (2006.01) | |
| *G06N 20/00* | (2019.01) | |

(52) U.S. Cl.
CPC ..... *G05B 19/4065* (2013.01); *B23Q 17/0971* (2013.01); *G06N 20/00* (2019.01); *G05B 2219/34048* (2013.01); *G05B 2219/37256* (2013.01); *G05B 2219/37351* (2013.01); *G05B 2219/37434* (2013.01)

(58) Field of Classification Search
CPC .......................... B23Q 17/0971; B23Q 17/12; G05B 19/4065; G05B 2219/34048; G05B 2219/37256; G05B 2219/37351; G05B 2219/37434
USPC ........................................................ 700/175
See application file for complete search history.

(56) References Cited

U.S. PATENT DOCUMENTS

| | | | |
|---|---|---|---|
| 5,210,704 A | | 5/1993 | Husseiny |
| 5,566,092 A | * | 10/1996 | Wang ................. G05B 19/4184 700/159 |
| 6,199,018 B1 | | 3/2001 | Quist et al. |
| 8,332,337 B2 | | 12/2012 | Harrison et al. |
| 8,849,586 B1 | | 9/2014 | Garvey et al. |
| 2005/0021302 A1 | * | 1/2005 | Dimino .............. G05B 23/0229 702/185 |

(Continued)

FOREIGN PATENT DOCUMENTS

WO      2016184912      11/2016

*Primary Examiner* — Chun Cao
(74) *Attorney, Agent, or Firm* — Dentons Cohen & Grigsby P.C.

(57) ABSTRACT

A method for automated condition monitoring whereby techniques of automated vibration analysis and signal processing are combined with deep learning/machine learning techniques for an enhanced system of automated anomaly detection, problem classification, and problem regression. The method may be implemented in software, firmware or hardware to run autonomously. Machines monitored and analyzed according to the disclosed method are typically found in industrial plants or commercial applications, but the disclosed invention may be applied to any rotating equipment such as motors, fans, pumps, compressors, and etc., in any environment where they are functioning.

10 Claims, 1 Drawing Sheet

System Overview

(56) References Cited

U.S. PATENT DOCUMENTS

| | | | |
|---|---|---|---|
| 2012/0330578 A1* | 12/2012 | Kar | G01H 1/003 702/56 |
| 2016/0245279 A1 | 8/2016 | Pal et al. | |
| 2017/0011298 A1 | 1/2017 | Pal et al. | |
| 2017/0031329 A1 | 2/2017 | Inagaki et al. | |
| 2017/0117841 A1 | 4/2017 | Watanabe et al. | |
| 2017/0277995 A1 | 9/2017 | Giering et al. | |
| 2017/0293862 A1 | 10/2017 | Kamiya et al. | |
| 2017/0310483 A1 | 10/2017 | Nagao et al. | |

* cited by examiner

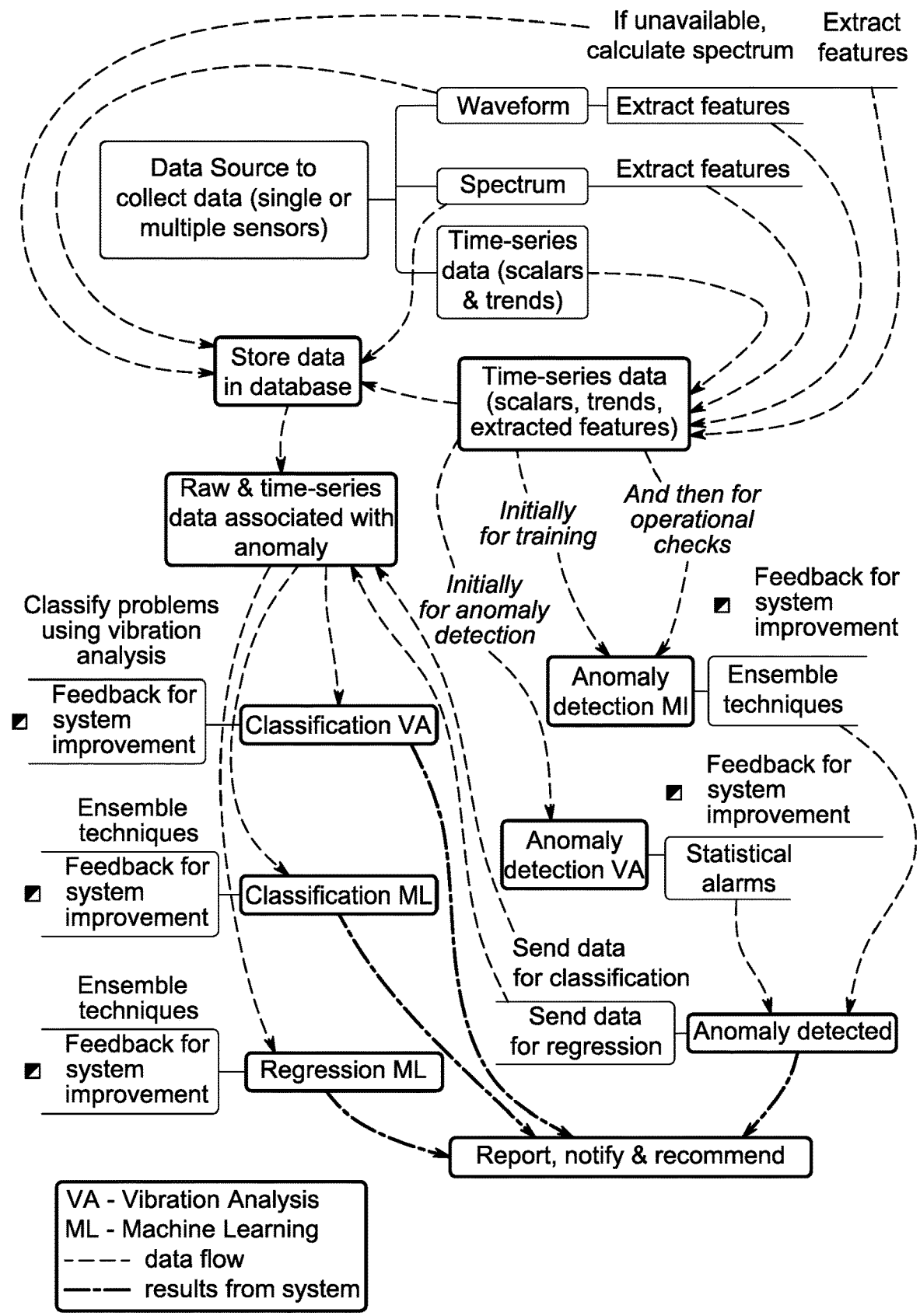
System Overview

AUTOMATED MACHINE ANALYSIS

BACKGROUND OF THE INVENTION

Field of the Invention

The presently disclosed invention relates to automated methods for monitoring the performance of machines by first determining a machine's current running state, and then using that state for comparison to on-going running conditions.

Description of the Prior Art

Signal processing, vibration analysis, and rule-based automated condition monitoring systems have existed for many years. At times, these systems can be effective in monitoring and classifying machine problems, but they suffer from a difficult and laborious setup, a lack of rules sufficient to cover various running conditions, and are not effectively generalized for application to a broad variety of machine processes or machine types.

In recent years, machine learning has been applied to machinery condition monitoring, particularly for purposes of anomaly detection. However, deep learning for machine problem classification has required very significant quantities of data to solve a particular problem type. The body of data quantitatively sufficient to train such systems (e.g. data from misaligned machinery) is rarely available for the machines that are being monitored and the problems that are being classified. Also, such prior systems lack specific vibration analysis techniques or recognition of subtleties of digitally processed signals to enable them to rapidly and reliably anticipate conditions that evidence abnormal machine wear or impending machine failure.

SUMMARY OF THE INVENTION

In accordance with the presently disclosed invention, vibration analysis is applied in combination with deep learning/machine learning and pre-classifying selected data. In this way, less data is required to train the deep learning/machine learning software for classifying abnormal mechanical functions and problems. Accordingly, such conditions can be identified sooner and with greater specificity. Through the combination of deep learning/machine learning with vibration analysis and with condition monitoring, automated analysis (anomaly detection, problem classification, and problem regression) can be accomplished more accurately and with fewer false alarms to afford decreased machinery downtime and lower overall maintenance cost.

BRIEF DESCRIPTION OF THE DRAWING

The patent or application file contains at least one drawing executed in color. Copies of this patent or patent application publication with color drawing(s) will be provided by the Office upon request and payment of the necessary fee.

The drawing (FIG. 1) illustrates the disclosed method and system wherein data flows from the data source and through the various steps and mechanisms for characterization, analysis, classification and detection. "VA" refers to vibration analysis techniques. "ML" refers to machine learning/deep learning techniques. The red lines indicate data flow through the system. The blue lines indicate the results, or the information produced by the system in the form of notifications, recommended actions, and status reports.

DESCRIPTION OF A PRESENTLY PREFERRED EMBODIMENT

As used herein, the following terms have the corresponding meanings:

Automated Predictive Maintenance—computer software and algorithms used to automatically determine a machine's health-state based on data collected from the machine in the form of spectra, waveforms, and scalar data Automated Vibration Analysis—the analysis of vibration data by software algorithms using signal processing techniques with the aim of reducing equipment downtime and maintenance cost, and in some cases to prevent machine failures by recommending corrective actions (e.g. balance or align a machine; adjust bearing lubrication)

Digital Signal Processing—the analysis of vibration signals in the time and frequency domains by digitizing data and then interpreting it Machine Condition Monitoring—determining and monitoring the condition of a machine based on data acquired about the machine's current operating state Automated Anomaly Detection—determining if a problem exists in a machine by comparing its current state to an acceptable state Automated Problem Classification—determining the underlying cause of a problem encountered based on the characteristics of the data collected on the machine Automated Problem Regression—determining the severity of a problem based on both acceptable level comparison and the rate of change Machine Learning—a field of computer science whereby the algorithms used determine the rules to evaluate the data based on the data itself; the rules of evaluation are automatically generated based on the data analyzed;

Deep Learning—a subfield of machine learning

Time-Series Data—a series of data points indexed in time order

Extracted Features—pulling key components from spectra and waveforms to characterize the information contained within the signal being represented Scalar—single point data representing some characteristic of the machine (e.g. speed or overall energy)

Trend—a group of related scalar values in a time-series

Data Source—a device connected to accelerometers, proximity probes, or another system to collect signals representative of the vibration in a mechanical system Waveform—a representation of a signal's amplitude over time (e.g. amplitude in g's over time in seconds)

Spectrum—a representation of a signal's amplitude over frequency after the transformation of a waveform using a Fast Fourier Transform Ensemble Techniques—the use of multiple deep learning/machine learning techniques and the combining of the results for a better outcome, as some deep learning/machine learning methods do better at certain tasks.

As illustrated in the FIGURE, time-series data (scalar and trends), along with spectra and waveforms are collected from a data source on a periodic basis. The period is initially set by a user, but may be adjusted by the system subject to predetermined operational rules. The time-series data may be stored in its raw form. These scalar or trend values may represent primarily vibration or angular speed, but may also represent environmental values such as temperature, humidity or other values. Also, the scalar or trend values may represent subjective data that is entered by a machine operator such as current load and current perceived operating state.

In accordance with the disclosed invention, waveforms are captured and programmatically characterized by extracting key features by means of vibration analysis and signal processing techniques and converting such features into time-series data. Such features may contain information in the waveform that is pertinent for determining machine state and classifying problems abnormal function of the machine. Examples of such extracted features may include Overall Energy, Crest Factor, Periodicity, G-Swing, as well as other key factors. This process may be executed by software operating autonomously. If a spectrum is unavailable from the data source, it may be calculated from this waveform.

The spectrum may be programmatically characterized by extracting key features from it using vibration analysis and signal processing techniques and converting said features into time-series data. These features should contain the pertinent data from the spectrum to determine machine state and possibly classify any problems evident in the data. Examples of extracted features might include Overall Energy, number of peaks exceeding a threshold, number of sidebands, frequency of largest peaks, and other factors. This extraction/characterization process may be carried out by software operating autonomously.

Store these extracted features as time-series data along with the time-series data collected directly from the data source. Raw inputs to the system may be stored before such time-series data is collected and stored.

Combine the extracted features and the time-series data to determine statistically valid alarms for alert and alarm state detection, and to look for correlating data. Once the alarms and alert values are established, data may also be collected on an exception basis (e.g. when an alarm is exceeded) in addition to the time-series data above. However, once collected, the data may be characterized and processed in the same way.

Feed the same data to several deep learning/machine learning methods, particularly relating data of the same type across a bearing location, across multiple bearing locations, across a machine, and across machine couplings. Deep learning/machine learning techniques add exceptional value for these complex classification tasks, and clustering the data into directionality, machine end, and frequency components (typical vibration analysis techniques) will further enhance automated analysis.

Initially, this extracted data may be used to train the deep learning/machine learning steps and for determining steady-state running condition of the machine that is being monitored. Once the system is trained, subsequent data may be used for anomaly detection, classification, and regression analysis, and also may be fed back into the system for enhanced training.

Because of the features extracted from the raw data, some machine classification can be done using vibration analysis techniques without the extensive data needed to train the machine learning algorithms to classify problems. As monitoring continues, the data needed can be gathered and "pre-classified." The pre-classified data may be used to train additional deep learning/machine learning algorithms for improved classification as "problem-classified data" is gathered.

In a particular example of a preferred embodiment, data representing synchronous harmonic families is collected. Each spectrum includes only one synchronous harmonic family. The synchronous harmonic family represents selected integral orders of rotational speed are stored in respective data bins. (e.g. if x is a fundamental rotational speed, 1x, 2x, 3x, . . . nx represent the synchronous harmonic family of x for integral values from 1 to n). That data is then collected and the total energy represented by the bin values is calculated. Frequency data that represents energy outside the collected bin data is not used. Only frequency data from the bins and representing integer multiples of the fundamental rotational speed is used.

The bin data also includes data that represents repeating frequencies that are not integral multiples of the fundamental rotational speed. This frequency data is referred to as non-synchronous harmonic families. The frequency spectrum may include more than one non-synchronous harmonic family. The total energy that is represented by each individual non-synchronous harmonic family and ignoring all other energy in the spectrum is also calculated.

The non-synchronous harmonic family information is used to determine certain bearing information. In an example of a preferred embodiment, the non-synchronous harmonic family data is used to determine the number of elements that are associated with each bearing (e.g. an inner race, an outer race, and roller or ball elements). Based on that data, the angular frequency of the cage and the spin frequency of the roller or ball elements is also determined.

After the synchronous and non-synchronous harmonic families are identified, sidebands that correspond respectively to one of the synchronous families or one of the non-synchronous families are identified. Such sidebands are identified according to either amplitude modulation or frequency modulation of the dominant family signal. It has been found that such sideband frequencies are associated with abnormalities in rotating machinery such as bearings or gearboxes. Such sidebands can also be catalogued to serve as useful predictor of other machine malfunctions.

From the frequency information, the number of waveform periods that are represented in the data sample are determined. From that data, factors that express the peakedness and variance in the signal are determined.

What is claimed is:

1. A method for determining wear conditions in a machine that produces vibration of mechanical parts of said machine, said method comprising the steps of:
   generating signals from at least one sensor that produces signals in response to vibration in said mechanical parts of said machine;
   storing data from signals that are generated by said at least one sensor that are generated in response to vibrations of said mechanical parts of said machine;
   determining at least one synchronous harmonic family within data from signals that are generated by said at least one sensor, wherein each of said at least one synchronous harmonic family includes one or more member signals that represent a fundamental frequency or an integral multiples of said fundamental frequency,
   determining at least one non-synchronous harmonic family within data from signals that are generated by said at least one sensor, wherein each of said at least one non-synchronous harmonic family includes one or more member signals having a frequency that is not an integral multiple of said fundamental frequency;
   associating the at least one non-synchronous harmonic family with a specific mechanical part of said machine;
   identifying sidebands that correspond to each member of said at least one synchronous harmonic family or to each member of said at least one non-harmonic family, wherein said sidebands of said member of said synchronous harmonic family or said sidebands of each member of said non-harmonic family are identified according to either amplitude modulation or frequency modulation or both amplitude and frequency modulation in comparison to the member signals of said at least one synchronous harmonic family or in comparison to the member signals of said at least one non-synchronous harmonic family; and identifying trends in the members of said synchronous harmonic families, the members of said non-synchronous harmonic families, and/or the sidebands of said members of said synchronous harmonic families or the sidebands of said member of said non-synchronous harmonic families that correspond to abnormal wear or abnormal operation of said mechanical parts of said machine.

2. The method of claim 1 wherein said step of identifying trends includes comparing the amplitude of said members of said non-synchronous harmonic families, and/or the sidebands of said members of said synchronous harmonic families, and/or the sidebands of said members of said non-synchronous harmonic families to the progression of mechanical wear of said mechanical parts of said machine.

3. The method of claim 1 wherein said step of identifying trends includes comparing the frequency of the members of said non-synchronous harmonic families, and/or the sidebands of said members of said synchronous harmonic families or the sidebands of said members of said non-synchronous harmonic families to the progression of mechanical wear of said mechanical parts of said machine.

4. The method of claim 1 wherein said step of identifying trends includes comparing two or more members of said synchronous harmonic family to the progression of mechanical wear of said mechanical parts of said machine.

5. The method of claim 1 wherein said step of identifying trends includes comparing two or more members of said non-synchronous harmonic family to the progression of mechanical wear of said mechanical parts of said machine.

6. The method of claim 1 wherein said step of identifying trends includes comparing two or more sidebands of members of said synchronous harmonic family to the progression of mechanical wear of said mechanical parts of said machine.

7. The method of claim 1 wherein said step of identifying trends includes comparing two or more sidebands of members of said non-synchronous harmonic family to the progression of mechanical wear of said mechanical parts of said machine.

8. The method of claim 1 wherein said step of identifying trends includes comparing two or more sidebands of members of two or more non-synchronous harmonic families to the progression of mechanical wear of said mechanical parts of said machine.

9. The method of claim 1 wherein said synchronous harmonic family is determined according to the total energy of the members of said synchronous harmonic family.

10. The method of claim 1 wherein said non-synchronous harmonic family is determined according to the total energy of the members of said non-synchronous harmonic family.

* * * * *